(12) United States Patent
Gancarz et al.

(10) Patent No.: US 9,792,653 B2
(45) Date of Patent: Oct. 17, 2017

(54) RECOMMENDER ENGINE FOR COLLECTIONS TREATMENT SELECTION

(75) Inventors: Gregory Gancarz, San Diego, CA (US); Jenny Zhang, San Diego, CA (US); Kathleen Marie Crowe, San Diego, CA (US)

(73) Assignee: Opera Solutions U.S.A., LLC, Jersey City, NJ (US)

( * ) Notice: Subject to any disclaimer, the term of this patent is extended or adjusted under 35 U.S.C. 154(b) by 782 days.

(21) Appl. No.: 13/324,445

(22) Filed: Dec. 13, 2011

(65) Prior Publication Data

US 2013/0151383 A1    Jun. 13, 2013

(51) Int. Cl.
| | | |
|---|---|---|
| G07B 17/00 | (2006.01) | |
| G07F 19/00 | (2006.01) | |
| G06F 17/22 | (2006.01) | |
| G07F 7/10 | (2006.01) | |
| G06Q 40/08 | (2012.01) | |
| G06Q 40/02 | (2012.01) | |
| G06F 15/18 | (2006.01) | |
| G06Q 40/00 | (2012.01) | |
| G06F 17/40 | (2006.01) | |
| G06F 17/30 | (2006.01) | |
| G06Q 30/00 | (2012.01) | |

(52) U.S. Cl.
CPC ............ *G06Q 40/08* (2013.01); *G06Q 40/02* (2013.01); *G06Q 40/12* (2013.12); *G06F 15/18* (2013.01); *G06F 17/30* (2013.01); *G06F 17/40* (2013.01); *G06Q 30/00* (2013.01); *G06Q 40/00* (2013.01)

(58) Field of Classification Search
CPC ...... G06Q 40/00–40/12; G06Q 40/025; G06Q 20/00–20/04; G06Q 30/00–30/02; G06Q 10/00; G06Q 50/00; G06F 15/18; G06F 17/30; G06F 17/40

USPC ..... 705/30, 35, 36 R, 38, 40, 45, 7, 500, 12, 705/7.31

See application file for complete search history.

(56) References Cited

U.S. PATENT DOCUMENTS 6,119,103 A * 9/2000 Basch ................ G06Q 20/341
                                                      705/35
6,456,983 B1 * 9/2002 Keyes ................ G06Q 20/102
                                                      705/36 R (Continued)

OTHER PUBLICATIONS

International Search Report of the International Searching Authority dated Mar. 8, 2013, issued in connection with International Application No. PCT/US12/69172 (2 pages).

(Continued)

*Primary Examiner* — Olusegun Goyea
(74) *Attorney, Agent, or Firm* — McCarter & English, LLP

(57) ABSTRACT

A system for automatically recommending treatments for delinquent accounts in collections is provided. The system includes one or more sub-models for analyzing and scoring delinquent accounts and comparing them to historical accounts to identify similar historical accounts. The system can select and recommend one or more treatments for the delinquent account based on treatments for the historical accounts that may have previously provided a favorable outcome for a similar account. The system may test the efficacy of new treatments and incorporate the results into the memory, thereby learning and adapting to new treatments and account behavior.

40 Claims, 3 Drawing Sheets

(56) References Cited

U.S. PATENT DOCUMENTS

| | | | | |
|---|---|---|---|---|
| 7,191,150 B1* | 3/2007 | Shao | G06Q 10/06312 | |
| | | | 705/35 | |
| 7,536,348 B2* | 5/2009 | Shao | G06Q 10/06312 | |
| | | | 705/35 | |
| 2004/0044604 A1* | 3/2004 | O'Neil | G06Q 40/02 | |
| | | | 705/35 | |
| 2004/0088253 A1* | 5/2004 | Crispyn | G06Q 30/04 | |
| | | | 705/40 | |
| 2004/0128236 A1* | 7/2004 | Brown | G06Q 20/10 | |
| | | | 705/39 | |
| 2005/0080821 A1* | 4/2005 | Breil | G06Q 40/02 | |
| 2007/0043662 A1* | 2/2007 | Lancaster | G06Q 40/025 | |
| | | | 705/38 | |
| 2007/0094060 A1* | 4/2007 | Apps | G06F 17/30398 | |
| | | | 705/7.36 | |
| 2007/0094181 A1* | 4/2007 | Tayebnejad | G06Q 40/08 | |
| | | | 706/21 | |
| 2007/0156557 A1* | 7/2007 | Shao | G06Q 10/06312 | |
| | | | 705/35 | |
| 2007/0156580 A1* | 7/2007 | Imrey | G06Q 20/02 | |
| | | | 705/39 | |
| 2008/0010188 A1* | 1/2008 | Beardsell | G06Q 40/00 | |
| | | | 705/38 | |
| 2008/0077525 A1* | 3/2008 | Willey | G06Q 20/04 | |
| | | | 705/40 | |
| 2008/0222054 A1* | 9/2008 | Blagg | G06Q 20/10 | |
| | | | 705/500 | |
| 2008/0277465 A1* | 11/2008 | Pletz | G06Q 20/24 | |
| | | | 235/379 | |
| 2010/0287093 A1* | 11/2010 | He | G06Q 40/025 | |
| | | | 705/38 | |
| 2011/0184777 A1* | 7/2011 | Shao | G06Q 30/02 | |
| | | | 705/7.31 | |
| 2011/0184884 A1* | 7/2011 | Lyons | G06Q 40/06 | |
| | | | 705/36 R | |
| 2011/0270779 A1 | 11/2011 | Showalter | | |

OTHER PUBLICATIONS

Written Opinion of the International Searching Authority dated Mar. 8, 2013, issued in connection with International Patent Appln. No. PCT/US12/69172 (8 pages).

* cited by examiner

```
<?xml version="1.0"?>
<delinquent_account>
<action = "New Request for Recommendation">
<customer id="123456789">
<account id="985612323" short-desc="Store Credit Card"'>
    <customer id="123456789"/>
    <balance>-2370.34</balance>
    <fees> 48</fees>
    <days_past_due> 90 </ days_past_due>
</account>
<name>
    <first-name>Gavin</first-name>
    <initial>A</initial>
    <last-name>King</last-name>
</name>
<employer>
    <current>ACME Company </current>
    <previous> Pest Control Company</previous>
</employer>
<score>
    <EXPERIAN>619 </EXPERIAN> </score>
<collection>
<treatment>
    <Description>Strongly Worded Letter </Description>
    <treatment_date> 01/01/1999</treatment_date>
    <amt_recovered>100 </amt_recovered>
</treatment>
</collection>
</customer>
</action>
</delinquent_account>
```

Fig. 3

RECOMMENDER ENGINE FOR COLLECTIONS TREATMENT SELECTION

FIELD OF THE INVENTION

The present invention relates generally to the recommendation of items, and in particular, but not exclusively, to an automated system for recommending treatments for accounts in collections.

BACKGROUND OF THE INVENTION

Today, original creditors, such as financial institutions, credit card issuers, utility companies and other service providers lose millions of dollars from uncollectible customer accounts. An original creditor may refer a customer's account to collections (hereinafter "delinquent account") when no payment has been received at the end of one or more billing periods. Most original creditors have a collections department, in which delinquent accounts may be segmented into buckets. The buckets may identify the billing cycle that a particular delinquent account falls under. The buckets may generally relate to a length of time that a delinquent account is past due, for example, 1-30 days, 31-60 days or 61-90 days. The buckets may further be divided into smaller risk segments, for example, High Risk (low credit score, defaulted on last payment plan and several past bad debt accounts in the last 12 months) or Medium Risk (average credit score, history of on-time payments and less than 2 past bad debt accounts in the last 12 months).

Each of the bucket-risk segment combinations described above may roughly correspond to a particular set of treatments. For example, a delinquent account which has just entered collections (bucket 1) and is likely to pay the money back (low risk segment) may receive only a nicely worded reminder letter, or no action by the original creditor. After several consistent payments, the original creditors may "re-age" a delinquent account and may bring it back to a current status. A long overdue delinquent account which has a very low chance of repayment (high risk), may be charged-off by the original creditor; the balance of the delinquent account may either be sold or outsourced to a collection agency or other type of debt collection entity. The original creditor may also note the charge-off on the consumer's credit report for several years. An original creditor may also send a delinquent account to litigation, e.g. depending on the outstanding balance of the delinquent account.

This segmentation approach presents several problems although it bears some merit and may have been successful in the past. For example, the segmentation approach may create a system with a spaghetti-like environment, unprincipled and complex segmentation boundaries, non-optimal mappings between segments and treatments, and numerous rules. In another example, the segmentation approach may lack the ability to automatically learn and adapt to changes in the environment. In a further example, the segmentation approach may also suffer from an inability to rapidly apply aggressive treatments to a delinquent account that may currently be in a segmentation bucket that prohibits such aggressive treatment.

Therefore, there is a need for a system to evaluate the effectiveness of different treatments for delinquent accounts and provide dynamic treatment recommendations for changes in the environment of delinquent accounts.

SUMMARY OF THE INVENTION

The invention provides a recommender engine to analyze the effectiveness of treatments for delinquent accounts and make treatment recommendations, by using one or more sub-models, such as predictive models to analyze delinquent accounts and predict the likelihood that delinquent accounts may self-cure (become current without any intervention).

Embodiments of the present invention may include a computer-implemented method for recommending one or more treatments for delinquent accounts at a particular point in time. The method capable of performing at least the following steps of: accessing one or more servers, the one or more servers comprising a database with one or more sub-models, and a memory comprising reference data for historical accounts; expressing the reference data as a first set of n-element feature vectors in an n-dimensional feature space (historical vectors); receiving one or more recommendation request data records for delinquent accounts; converting the one or more recommendation request data records with the scores from one or more sub-models to a second set of n-element feature vectors in an n-dimensional feature space (request vectors); determining neighbors (neighbor vectors) from the first set of n-element feature vectors (historical vectors) for each of the second set of n-element feature vectors (request vectors), based on a recommender algorithm analysis of the n-dimensional feature space; from a superset list of treatments (all treatments), generating a second, subset list of possible treatments (allowed treatments) allowed by one or more sets of policy and regulation rules; for each treatment in the allowed treatments list, computing a fitness score utilizing in general the reference data (historical vectors), and in particular, the data from the neighbors (neighbor vectors); for each of the recommendation requests (vectors B), selecting at least one of the treatments available from the list of possible treatments for each of the delinquent accounts (allowed treatments); and presenting the selected at least one treatment to a user to produce the recommended treatment(s).

Embodiments of the present invention may include a system for recommending treatments for delinquent accounts at a particular point in time. The system includes a processor operable to execute programs; a memory coupled to the processor; a database associated with said processor and said memory; the memory comprising reference data for historical accounts; said programs comprising one or more sub-models; a program stored in the memory and executable by the processors, the program being operable to accessing reference data for historical account in the memory and the one or more sub-models, and implementing the recommendation method described above.

Embodiments of the present invention may include a user interface for a computer program so users may gain-insight to the system's operations or to fine-tune rules for a recommender engine for recommending one or more treatments for delinquent accounts. The user interface comprising a processor operable to execute programs; a memory coupled to the processor; the memory comprising reference data for historical accounts; a database associated with said processor and said memory; said programs comprising one or more sub-models; an analysis program stored in the memory, executable by the processor, the analysis program being operable to accessing the one or more sub-models in the database; expressing the reference data for historical accounts in the one or more sub-models as n-feature vectors in an n-dimensional feature space; reducing the n-dimensional feature space; selecting at least one of the n-feature vectors; generating a report about treatments and their efficacy for the selected at least one of the n-feature vectors;

and displaying one or more fields for fine tuning rules for the treatments and the selected at least one of the n-feature vectors.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 3 illustrates an excerpt from an exemplary Application Programming Interface (API) template in Extensible Markup Language (XML) format used for adding scoring data records to a recommender engine according to one embodiment of the invention.

DETAILED DESCRIPTION OF THE INVENTION

Figure 1:
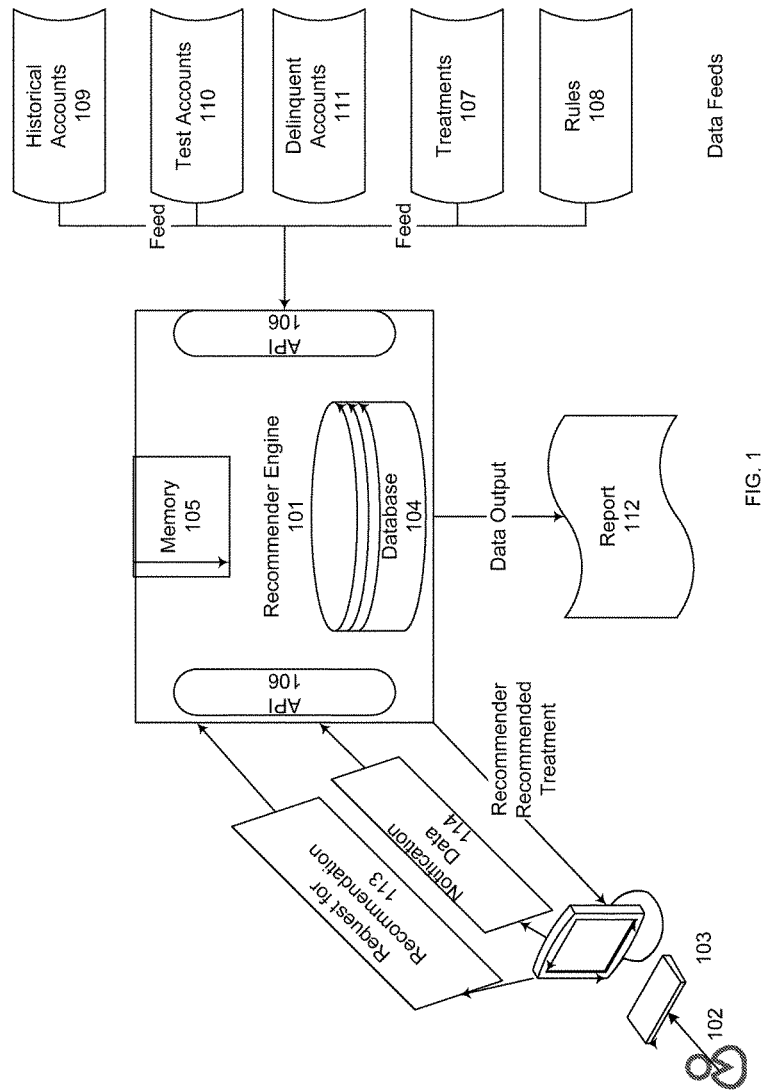
FIG. 1 is a conceptual diagram of a system for recommending a treatment for a delinquent account according to one embodiment of the invention.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

Recommender systems or engines may be used to generate meaningful recommendations to a collection of users for items or products that might interest them. For example, suggestions for books on AMAZON, or movies on NETFLIX, are real world examples of the operation of industry-strength recommender systems. The design of such recommendation systems may depends on the domain and the particular characteristics of the data available. For example, movie watchers on NETFLIX frequently provide ratings on a scale of 1 (disliked) to 5 (liked). Such a data source records the quality of interactions between users and items. Additionally, the recommendation system may have access to user-specific and item-specific profile attributes such as demographics and product descriptions respectively. Recommender systems differ in the way they analyze these data sources to develop notions of affinity between users and items which can be used to identify well-matched pairs.

The myriad of approaches to recommender systems may be categorized broadly as Collaborative Filtering, Content-based recommending or Hybrid approaches. Content-based approaches may work by recommending items that are similar in content to items the user may have preferred in the past, or matched to attributes of a user.

The Hybrid approach recommender systems leverage the strengths of the content-based and collaborative recommenders. For example, the Hybrid approach may allow both content-based and collaborative filtering methods to produce separate ranked lists of recommendations, and then merge their results to produce a final list.

Collaborative Filtering is the process of filtering for information or patterns using techniques involving collaboration among multiple agents, viewpoints, data sources, etc. Applications of collaborative filtering typically involve very large data sets. Collaborative filtering methods have been applied to many different kinds of data including sensing and monitoring data—such as in mineral exploration, environmental sensing over large areas or multiple sensors; financial data—such as financial service institutions that integrate many financial sources; or in electronic commerce and web 2.0 applications where the focus may be on user data, etc. Collaborative filtering may be used to make automatic predictions (filtering) about the interests of a user by collecting taste information from many users (collaborating). The underlying assumption of the Collaborative filtering approach may be that those who agreed in the past tend to agree again in the future. For example, a collaborative filtering or recommendation system for television tastes could make predictions about which television show a user should like given a partial list of that user's tastes (likes or dislikes). Most collaborative filtering systems have the following common elements:

Look for users/items who share the same rating patterns with the active user/item (the user/item that the prediction may be for).

Use the ratings from those like-minded users/similar items found in step 1 to calculate a prediction for the active user/item.

Another form of collaborative filtering may be based on implicit observations of normal user behavior (as opposed to the artificial behavior imposed by a rating task). In these systems you may observe what a user has done together with what all users may have done (what music they have listened to, what items they have bought) and may use that data to predict the user's behavior in the future or to predict how a user might like to behave if only they were given a chance. These predictions may then be filtered through business logic to determine how these predictions might affect what a business system ought to do. It may be, for instance, not useful to offer to sell somebody some music if they already have demonstrated that they own that music or, considering another example, it may not be useful to suggest more travel guides for Paris to someone who already bought a travel guide for this city.

There are three types of collaborative filtering methods, memory-based, model-based and hybrids algorithms. Memory-based collaborative filtering algorithms may utilize user rating data to compute similarity between users or items. Memory-based algorithms may be used for making recommendations and may be used in many commercial systems. Memory-based algorithms may be easy to implement and are effective. Typical examples of Memory-based algorithms may be neighborhood based collaborative filtering and item-based/user-based top-N recommendations. The neighborhood-based algorithm may calculate the similarity between two users or items, produce a prediction for the user taking the weighted average of all the ratings. Similarity computation between items or users may be an important part of this approach. Multiple mechanisms such as Pearson correlation and vector cosine based similarity may be used for this neighborhood-based algorithm approach. The user based top-N recommendation algorithm identifies the k most similar users to an active user using similarity based vector model. After the k most similar users are found, their corresponding user-item matrices are aggregated to identify the set of items to be recommended. A popular method to find the similar users may be the locality sensitive hashing, which may implement the nearest neighbor mechanism in linear time.

Model-based collaborative filtering algorithms are developed using data mining, machine learning algorithms to find patterns based on training data. These may be used to make predictions for real data. There are many model based Collaborative Filtering algorithms, such as Bayesian Networks, clustering models, latent semantic models such as singular value decomposition, probabilistic latent semantic analysis, Multiple Multiplicative Factor, Latent Dirichlet allocation and Markov decision process based models. Model-based algorithms may have a more holistic goal to uncover latent factors that explain observed ratings. Most of the Model-based algorithms may be based on creating a classification or clustering technique to identify the user based on the test set. The number of the parameters may be reduced based on types of principal component analysis.

Hybrid collaborative filtering algorithms combine the memory-based and the model-based collaborative filtering algorithms. Hybrid algorithms may overcome the limitations of other collaborative filtering approaches. Hybrid algorithms may provide improved prediction performance over memory-based or model-based algorithms. Importantly, hybrid algorithms may overcome the collaborative filtering problems such as sparsity and loss of information. However, hybrid algorithms may have increased complexity and may be more expensive to implement.

In one embodiment of the invention, a recommender engine 101 is provided that may use a neighborhood-based/memory-based collaborative filtering approach to recommend consumer items or products. In some alternatives of the invention, the consumer items or products may be consumer accounts, consumer accounts at various states in a debt collection cycle, such as historical accounts, delinquent accounts, new accounts or test accounts. The recommender engine 101 may be implemented with one or more computer systems. Each computer system may be well known to those skilled in the art and may include a display, a central processor, a system memory 105, and a system bus that couples various system components including the system memory 105 to the central processor unit. System bus may be any of several types of bus structures including a memory bus or memory controller, a peripheral bus, and a local bus using any of a variety of bus architectures. The structure of system memory 105 may be well known to those skilled in the art and may include a basic input/output system (BIOS) stored in a read only memory (ROM) and one or more program modules such as operating systems, application programs and program data stored in random access memory (RAM). The computer systems may also include a variety of interface units and drives for reading and writing data and a database 104 for storing data. The computer systems may operate under the Linux Operating system, Microsoft Operating system or other operating system. The computer systems that implement the recommender engine 101 may be implemented on a variety of hardware platforms or implemented in a variety of software environments.

As used herein, a database 104 may be a relational database, flat file database, relational database management system, object database management system, operational database, data warehouse, hyper media database, post-relational database, hybrid database models, RDF database, key value database, XML database, XML store, text file, flat file or other type of database.

In one embodiment of the invention, the recommender engine 101 may be a net-centric real-time system implemented in an Application Service Provider (ASP) model that allows users to receive dynamic treatment recommendations for delinquent accounts. An ASP model includes but may not be limited to a model wherein an application may be hosted on a server which can be accessed by the Internet or a network. In one alternative, the present invention may be embodied in a computer program, typically an application program running on a Web server that facilitates the ad-hoc treatment recommendations for delinquent accounts. Although the illustrative embodiment will be generally described in the context of an application running on a Web server, otherwise known as an ASP model, those skilled in the art will recognize that the present invention may be implemented in any distributed computing environment including local area networks, wide area networks, and the Internet. The network may include permanent connections, such as wire or fiber optic cables, or temporary connections made through telephone or wireless communications. The distributed computing environments may include the Internet with networks representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), and others.

In some alternatives, the recommender engine 101 may operate in a model using an Extensible Markup Language (XML) interface. In some alternatives, the recommender engine 101 may comprise a secure Internet Web site or gateway, thereby ensuring the privacy of users and customer data. The recommendation engine 101 may minimize the amount of hardware and software the users must purchase and maintain. In some alternatives, the recommender engine 101 may be accessed from a users' 102 Web site. In some alternatives, the recommender engine 101 may also be accessed via a Virtual Private Network (VPN).

In some alternatives, the recommender engine 101 may consist of an Application Programming Interface (API). The API may consist of a number of function calls to the recommender engine 101. The API may be accessed using communication protocols, such as the Simple Object Access Protocol (SOAP) protocol and data may be submitted to the API using XML. In some alternatives, calls to the API may be synchronous.

In some alternatives, the recommender engine 101 may be deployed in an ASP model in which the client device sends data to the recommender engine 101 and receives a response in real time. In some alternatives, the recommender engine 101 may be deployed in an ASP model in which there may be one or more additional layers between the client device sending the data and the recommender engine 101 receiving the data. Client devices accessing the recommender engine 101 may include, servers, personal computers, laptops, notebooks, netbooks, tablet PCs, smart phones and other wireless devices with a browser, which may be a well known software application for accessing documents and processing messages in a variety of formats, such as graphic files, word processing files, XML, Hypertext Markup Language (HTML), Handheld Device Markup Language (HDML), Wireless Markup Language (WML), Security Assertion Markup Language (SAML), and various other formats and types of files. Client devices may include a display, a processing unit, memory such as RAM and ROM etc, data and program storage, and network or Internet transmission media.

Figure 2:
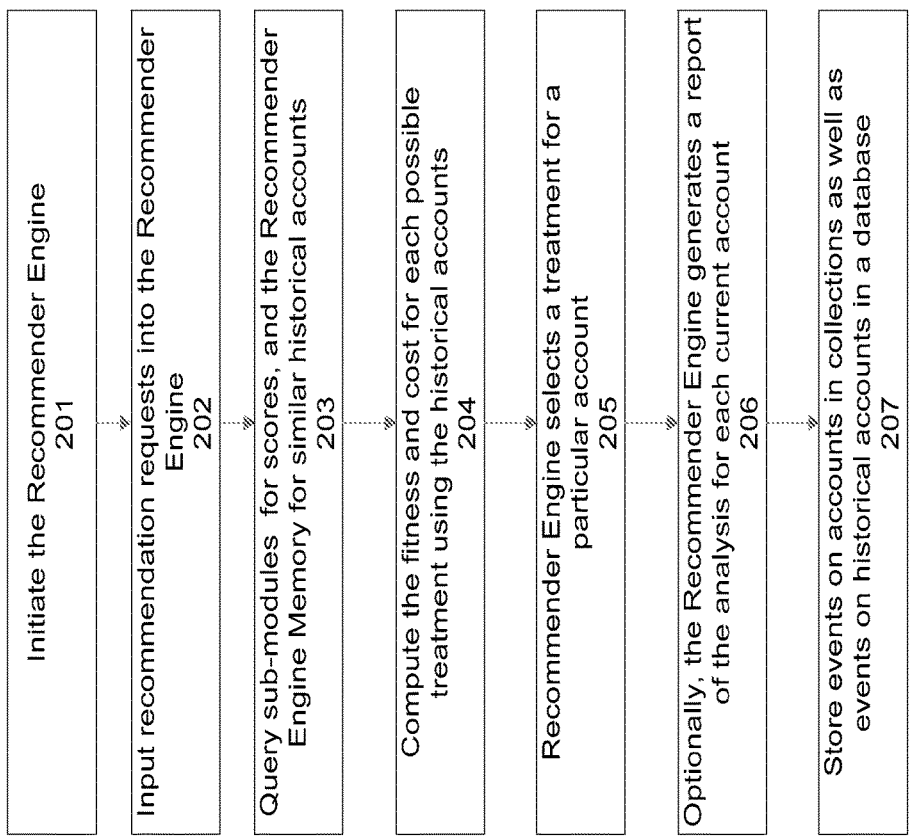
FIG. 2 is a flowchart illustrating a process for recommending a treatment for a delinquent account according to one embodiment of the invention.

Referring now to FIG. 2, there is shown an exemplary process for recommending a treatment for a consumer item or product. In some embodiments of the invention, the consumer item or product may be a delinquent account. In step 201, the recommender engine 101 may be initialized for processing a delinquent account 111 by populating the memory 105 with historical accounts 109 from the database 104. In some alternatives, the historical accounts 109, test accounts 110, treatments 107 or rules 108 data (hereinafter "reference data") may be input into the recommender engine 101 using communication techniques, such as a communication link via HTTPS, SOAP envelopes, or XML input and output documents or other mechanisms known in the art. For security reasons, the invention may use the Hypertext Transfer Protocol Secure (HTTPS) protocol, routed through selected system ports, as the communication protocol for remote API calls over the Internet. In some alternatives, electronic data exchange between the source systems for reference data and the recommender engine 101 may be facilitated by XML input and output payloads incorporating consumer and/or business data. In some alternatives, the recommender engine 101 may use the XML 1.0 specifications, which can be found on the Internet. In some alternatives, as part of the API calls, an XML schema may be provided that contains a data model for validating input and output reference data. In some alternatives, reference data may be input into the recommender engine 101 via a batch process. In some alternatives, the reference data for historical accounts transferred to the memory 105 may reside in a database 104.

In some alternatives, the recommender system 101 may start up without any historical accounts 109 in memory and learn on its own. In some alternatives, the memory 105 of the recommender engine 101 may contain reference data from historical accounts 109 such as account demographics, treatments, model scores, account properties, account behaviors (e.g. promises to pay), days past due, the final collections result on the account, and other account attributes. In some alternatives, the memory 105 may contain multiple entries for a particular historical account 109. The multiple entries may represent snapshots of the historical accounts 109 at different points in time.

In some alternatives, the recommender engine 101 memory 105 may contain a list of treatments 107 available for all types of delinquent accounts. In some alternatives, similar treatments 107 with significantly varying intensity may be represented as separate treatments in the recommender engine 101. For example, a strongly worded letter may be represented as a separate treatment 107 than a gentle reminder letter. In some alternatives, the single treatment 107 represented in the recommender engine 101 may contain several sub-treatments 107 in a particular order and timing. Other examples of treatments 107 may include a letter sent to the holder of a delinquent account (hereinafter "debtor"), a phone call may be made by a collection specialist, or no action at all may be taken. Letters and phone calls may be made at a variety of different times, and may target both the debtor's home and work locations. Electronic mail and Short Message Service (SMS) messages may also be used to contact the debtor. The original creditor may assess late fees and penalties to the debtor's delinquent account, and the original creditor may offer the debtor delinquent account counseling. The original creditor may allow the debtor to restructure the delinquent account, forgive a portion of the delinquent account, make multiple smaller payments or borrow additional money. The original creditor may perform a skip trace search if the debtor is missing. Finally, the original creditor may pursue legal action against the debtor or sell the delinquent account to a collection agency or other debt collection facility.

An operational cost may be assigned to each treatment 107 by the users 102 of the recommender engine 101 or by the recommender engine 101 based on analysis of historical data 109. A relationship cost may also be assigned to each treatment 107 by users 102 of the system or by the recommender engine 101 based on analysis of historical data 109.

In some alternatives, the recommender engine 101 memory 105 may contain a set of rules 108. The rules 108 may restrict which particular treatment 107 a delinquent account 111 may be eligible to receive at a particular point in time. For example, a rule 108 may suggest that a delinquent account 111 less than 10 days past due cannot be sent a strongly worded letter. In some alternatives, the rules 108 may embody the policy of a particular original creditor as well as any applicable governmental or financial industry regulations. In some alternatives, the rules 108 may also represent interactions between treatments 107. For example, the rules 108 may suggest that a settlement offer may not be presented to a delinquent account 111, which had been in a forbearance program anytime in its history. In another example, an individual rule 108 might state: "If 3 or more letters have been sent in the last 60 days and no response received, consider rule 'ignored #1' to have fired." In another example, another rule 108 might state: "If 2 or more 'ignored' rules fire and the outstanding delinquent account may be over $150, then utilize phone call script #6." In this example, "phone script #6" may be a specifically developed script for collectors to use with debtors who ignore communication efforts. In some alternatives, rules 108 may typically have tunable parameters, for example, "3 letters," "60 days," "$150" "2 rules fired," etc. In some alternatives, the rules 108 may be authored by users 102 of the recommender engine 101. In some alternatives of the invention, the recommender engine 101 may be provided with a default set of rules 108 and these rules 108 may be modified by the users 102.

In some alternatives of the invention, the recommender engine 101 may output one or more types of reports 112. In some alternatives, the reports 112 may contain information or rationale by the recommending engine 101 for recommending a particular treatment 107. In some alternatives, human analysts may update the expert rules 108 in the recommender engine 101 as policies and regulations change. In some alternatives, a request for recommendation 113 from the users 102 may not update the recommender engine 101 memory 105. In some alternatives, users 102 may update the client device with a notification record 114 about a delinquent account 111. Notification records 114 received from the client device 103 of events that may have occurred with a delinquent account 111 may update the recommender engine 101 memory 105.

In step 202, a user 102 via the client device 103 may send a request for recommendation 113 or notification record 114 or scoring request data to the recommendation engine 101. In some alternatives, the scoring request data record may be a request for recommendation 113 or notification record 114 generated by the client device 103 containing fields as defined by an XML template or proprietarily API format as illustrated in FIG. 3. In some alternatives, the request for recommendation 113 or notification record 114 may contain scoring request data that may be scored by the sub-models in the recommender engine 101. In some alternatives, a request for recommendation 113 or notification record 114 from the client device 103 may not have the information needed to be scored by the sub-models, in that case, the recommender engine 101 may use an earlier sub-model score calculated for the delinquent account 111. For each delinquent account 111, at a particular point in time, the scoring request data record may be input into the recommender engine 101, as an XML document or in some other proprietary API format as illustrated in FIG. 3. The client device 103 may send the request for recommendation 113 or notification record 114 for a delinquent account 111 data or scoring request data to the recommender engine 101 in ASP mode via a web server. Specifically, the client device 103 may send the request for recommendation 113 or notification record 114 for the delinquent account 111 data or scoring request data as an XML document to the recommender engine 101 in a format defined by a proprietary API or other mechanisms known in the art for transmitting data.

In step 203, the recommender engine 101 may utilize one or more sub-models, generated using known techniques. In some alternatives, the sub-models may be predictive models. The recommender engine 101 may employ multiple different types of sub-models, including neural networks, regression analysis, integrated rules systems, decision tree models and other statistical models known in the art. In some alternatives, the sub-models may be used to predict accounts in early delinquency that will self-cure, straight roller accounts (accounts that will never be paid no matter what types of interventions are attempted), the correct collection specialist to work on a delinquent account, the optimum method of communicating with a debtor, the net present value of a delinquent account 111, and the best time to contact a debtor. The sub-models may be generated by using data from the recommender engine 101 memory 105, which may store historical accounts 109, all of their treatments 107 and rules 108 for use as neighbors to properly train the desired sub-model. Sampling of the data from the recommender engine 101 memory 105 may be conducted using any methods known in the art. The sub-models may convert the data to n-feature vectors in an n-dimensional feature space using known techniques. A feature vector may be generally an n-dimensional vector used in, for example pattern recognition and machine learning for providing a numerical representation of an object. Many algorithms in machine learning require a numerical representation of objects, because such representations may facilitate processing and statistical analysis. According to the present invention, each feature vector for sub-model scoring comprises many features derived from fields in the scoring request data record or historical accounts 109 data. In some alternatives of the invention, the n-dimensional feature space for determining neighbors may be a 3-dimensional feature space. In some alternatives, the n-feature vectors may be stored as a set of numbers.

In some alternatives, the sub-models may score the data received from the request for recommendation 113 or notification record 114 for a delinquent account 111. In some alternatives, the recommender engine 101 may query the sub-models for a score and the memory 105 for similar historical accounts 109 to the request for recommendation 113 or notification record 114 for a delinquent account 111 received by the recommender engine 101.

The recommender engine 101 may then query the rules to first determine the list of all treatments 107 that may be available from memory 105 for the delinquent account 111. It may be the case that no treatments 107 are available for a delinquent account 111 due to restrictions applied by the expert rules 108, in which case the recommender engine 101 may return a recommendation of no action to the client device 103. For example, the delinquent account 111 may already be enrolled in a forbearance program that has not yet completed.

If the recommender engine 101 locates one or more possible treatments 107 available for the delinquent account 111 at the present point in time, the recommender engine 101 may query its memory 105 to find a group of historical account 109 snapshots that may be similar to the delinquent account 111. The recommender engine 101 may retrieve scores from the one or more sub-models for the delinquent account 111. These scores may either be the most recent sub-models scores for the delinquent account or a scoring of the information present in the request for recommendation 113 or notification record 114 received from the client device 103 for the delinquent account 111. These numerical sub-model scores may be a dimension in the n-feature vector used in computing the distance between the delinquent accounts 111 and historical accounts 109, i.e., the distance between the delinquent account 111 vector and the historical accounts 109 vectors in memory 105. Similarity may be a function of closeness (distance) in the feature space, which includes predictive scores on the accounts, demographic information, balance, days past due, and other information which characterizes delinquent accounts. In some alternatives, the historical accounts 109 data in the memory 105 may be converted into n-feature vectors.

In some alternatives, the distance may be computed by one or more algorithms. In some alternatives, the algorithm may include a Mahalanobis distance calculation, Manhattan or Euclidean distance formulas or other known formulas known in the art to calculate distance between multiple vectors.

In some alternatives, the algorithm may utilize various similarity measures, such as the Pearson correlation coefficient, Spearman rank correlation, Kendall's $\tau$ correlation, mean squared differences, entropy, adjusted cosine similarity or other similarity measures known in the art.

The recommender engine 101 may not be limited to computing distance based on the raw information stored in memory 105, but rather may also utilize various transformations of the information in memory 105 as well. For example, the recommender engine 101 may disregard historical accounts 109 that entered collections longer than one or more years prior to the present scoring time. The recommender engine 101 may take the N (neighborhood size) closest historical accounts 109 to the delinquent account 111. In some alternatives, recommender engine 101 parameters, such as N may be set during implementation based on an analysis of historical data 109, but may also be adjusted by the users 102. In calculating the similarity between accounts, each feature may have a weight, which may determine how much that particular feature dimension influences the distance calculation. In some alternatives, transformations may be averages of a variable over time, or passing a value through a function such as a sigmoid, or other transform functions, such as taking the maximum value over a series of values. In computing the distance, a weight may multiply the absolute difference between a feature value to increase or decrease the contribution of that feature to the overall distance value.

In some alternatives, in lieu of storing all historical accounts 109 in memory 105, prototype accounts, i.e., a smaller list of historical accounts 109 may be selected from memory 105 and/or created by a technique such as learned vector quantization. Having a smaller number of prototype accounts in memory 105 may speed up the recommender engine 101 operations significantly.

In step 204, for each treatment 107 available to the delinquent account 109, the recommender engine 101 may query the memory for the ($N_t$) closest historical accounts 109 that may have received that particular treatment 107. For $N_t$, the recommender engine 101 may compute the average cost incurred on the delinquent accounts 109 through the time they exited collections, the recovery amount, time to recovery, recovery success percentage, and other performance measures for that particular treatment 107. These performance measures may be fed into a fitness function which summarizes the performance measures into a single fitness score. The fitness for any particular treatment 107 may be a combination of the overall average for group N and the average for set $N_t$, weighted by the number of accounts in set $N_t$. For example, if there is only one account in set $N_t$, the fitness may be close to the average for group N. For those actions which were not experienced by N, the system may assign that treatment the overall average performance measures and fitness for group N. The efficacy of taking no action may also be computed and competes with the other actions for selection as the recommended treatment, i.e., do nothing to this account at this time may be an action and in some cases may have better fitness than any other available action. In one alternative, the fitness function may be the sum of money paid back from current time through resolution point on a delinquent account or in a fixed look forward time window. In one alternative, the fitness function may be the sum of money paid back in a look forward time window on historical accounts 109 at a similar point in time in their history. Treatments 107 with an average fitness in historical accounts 109 that are higher than that of other treatments 107 may be recommended with higher frequency by the recommender engine 101. In some alternatives, the fitness score may also provide some indication of confidence. In some alternatives, intermediate success such as a promise to pay may be fed into the fitness function. In some alternatives, the feature weighting used in the distance calculation can vary based on delinquent account 111 properties (e.g. the features to consider for early stage delinquent accounts 111 may differ from those important for late stage delinquent accounts 111). In some alternatives, there may be one or more possible fitness functions. In some alternatives, the fitness function may vary based on whether the delinquent account 111 is early or late stage collections since the goal of the lender may be different for each stage. In some alternatives, the contribution of any particular historical account 109 to the performance measures and fitness function may be weighted by the recency of the historical account 109.

In some alternatives, for those treatments 107 that were not experienced by the group N, the recommender engine 101 may have models that predict the response to a particular treatment based on the group N response to other treatments 107. The recommender engine 101 may also expand its search beyond group N to gain information about responses to the treatment 107 being considered. In some alternatives, instead of looking for past treatments 107 in neighboring group N, the recommender engine 101 may instead analyze the closest accounts that may have received the treatment 107 being analyzed.

In some alternatives, records from delinquent accounts 111 not yet resolved may be added to the historical database 104 as they are fed into the recommender engine 101. They can be used in computing intermediate successes such as promises to pay, or can be ignored by the neighborhood function by querying whether the account in any historical record in memory 105 may have been resolved. In some alternatives, having all historical records enter memory 105 immediately simplifies the design of the recommender engine 101.

In step 205, the recommender engine 101 may select at least one treatment 107 for a delinquent account 109 and return this recommended treatment 107 via the client device 103 to the users 102. In some alternatives, the treatment 107 may be "take no action." The selection may be performed by using the treatment 107 fitness values to influence the probability that a treatment 107 may be selected. Using this probabilistic approach may ensure that the recommender engine tests out new treatments 107. Actively exploring the space of possible treatments 107 may be a way for the recommender engine 101 to experiment with, learn from, or enrich future data helping make the recommender engine 101 adaptive. In some alternatives, the recommender engine 101 may select an ordered list of top treatments 107 for the delinquent account 111 (as opposed to returning just a single recommended best treatment 107) thereby allowing the users 102 to select from the top treatments 107.

In some alternatives, the treatment 107 may be defined by time duration, such as days, weeks, or months. In some alternatives, the treatment 107 may be defined by a numeric value, such as a settlement percentage. In some alternatives, the treatment 107 may be defined by a frequency, such as how often to apply a treatment 107 within a particular time frame. In some alternatives, the overall categories of treatment 107 recommendations may include a specific treatment 107 to use, variant of the treatment 107, sequence of treatments 107, phone number to use, time of day to call, prioritization of accounts to receive treatment 107, or identify the specific collector to work on a delinquent account.

Optionally in step 206, the recommender engine 101 may provide a rationale for its treatment 107 recommendation, by generating one or more reports 112. The reports 112 may summarize the result of the recommender engine's 101 analysis for a particular delinquent account 111. This report 112 may provide details for each available treatment 107, the performance measurements which may have been fed into the fitness calculation, the number of similar historical accounts 109 used in the analysis and other values. This information may help the users 102 of the recommender engine 101 gain insight into the rationale behind the recommender engine's 101 selection of a particular treatment action 107 thereby increasing their confidence in the recommendation.

Finally, in step 207, the recommender engine 101 may output a snapshot of its historical database as well as any recommendations made daily for archiving and use in improving the recommender engine 101 performance through offline analysis of the recommender engine 101. In some alternatives, as delinquent accounts 111 exit collections, their histories may be added to the recommender engine's 101 database 104 of historical accounts 109 so that the information may drive future recommendations by the recommender engine 101.

In another embodiment of the invention, the recommender engine 101 may provide visualization functionality that enables users 102 to move to a point in the historical data 109 space (reduced to 3 dimensions either by selecting the most critical dimensions, or through a dimensionality reduction analytic technique). The visualization functionality may produce summary information about the treatments 107 and their efficacy in that region of the historical account 109 feature space. This may help users 102 to fine tune their expert rules 108 and gain insight into the operations of the recommender engine 101. In some alternatives, the historical data 109 space may be reduced to 3 dimensions by sub-models using sample data or testing data. In some alternatives, the dimensionality reduction analytic technique may include the sub-models selecting features to use for the neighborhood space using generally known techniques.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A system for recommending treatments for one or more delinquent accounts at a particular point in time comprising:
   a processor operable to execute programs;
   a memory comprising one or more sub-models and reference data for one or more prototype accounts, the prototype accounts being a subset of historical accounts stored in the memory and including results from test accounts created to test the efficacy of new treatments or new sets of rules, thereby providing a mechanism for learning and adapting to new treatments and debtor behavior;
   a database associated with said processor and said memory;
   a program stored in the memory and executable by the processor, the program being operable for:
   expressing the reference data as historical vectors in an n-dimensional feature space;
   receiving at least one recommendation request data record for each of one or more delinquent accounts;
   converting the at least one recommendation request data record to request vectors using scores from the one or more sub-models;
   selecting one or more neighbor vectors from the historical vectors for each of the request vectors, based on an algorithm analysis of data in the n-dimensional feature space;
   determining neighbor fitness values for each of the selected one or more neighbor vectors by looking forward in historical time for each of the one or more prototype accounts in the one or more neighbor vectors;
   generating, for each of the request vectors, a subset list of allowed treatments by applying one or more sets of policy or regulation rules to a superset list of all treatments, the subset and superset lists being generated regardless of similarities between the one or more delinquent accounts and the one or more neighbor vectors;
   computing a treatment fitness score for each of the treatments in the subset list, using the neighbor fitness values from the neighbor vectors that experienced a particular treatment being analyzed and using events outside the one or more neighbor vectors;
   selecting at least one of the treatments in the subset list for each of the at least one recommendation request based on the treatment fitness score to recommend treatments for delinquent accounts based on the success of treatments in the subset list; and
   presenting the selected at least one treatment to a user, wherein the one or more prototype accounts in the memory increases speed of operations of the program when the program is executed by the processor.

2. The system of claim 1, wherein the delinquent accounts are selected from the group comprising delinquent accounts, accounts in collection, historical accounts, test accounts, new accounts or combinations thereof.

3. The system of claim 1, wherein overall categories of the allowed treatments may include specific treatment to use, variant of the treatment, sequence of treatments, phone number to use, time of day to call, prioritization of accounts to receive treatment, specific collector to work an account.

4. The system of claim 1, wherein the one or more rules are selected from a group comprising policy and regulation expert rules, policies of the user, any applicable governmental regulations, financial industry regulations or combinations thereof.

5. The system of claim 1, further comprising the step of providing a rationale for recommending the selected at least one treatment.

6. The system of claim 1, wherein the sub-models are built using one or more models selected from a group comprising neural networks, regression analysis, integrated rules systems, decision tree models, other statistical models or combinations thereof.

7. The system of claim 1, wherein the reference data comprises account demographics, treatments, model scores, account properties, account behaviors, days past due, the final collections result on the account or combinations thereof.

8. The system of claim 1, wherein the reference data comprises multiple entries for historical account data at different points in time.

9. The system of claim 1, wherein receiving the one or more recommendation request data, further comprises receiving a request for recommendation or notification record from a client device in a predefined API or XML format.

10. The system of claim 1, wherein the algorithm includes a calculation of the similarity between two or more n-feature vectors in an n-dimensional feature space.

11. The system of claim 10, wherein the similarity is a calculation of the distance between two or more n-feature vectors in an n-dimensional feature space.

12. The system of claim 10, wherein the algorithm calculation is selected from a group comprising Mahalanobis distance calculation, Manhattan distance formulas, Euclidean distance formulas, Pearson correlation coefficient, Spearman rank correlation, Kendall's τ correlation, mean squared differences, entropy, adjusted cosine similarity or combinations thereof.

13. The system of claim 1, wherein the treatments are selected from a group which may include a letter sent by mail to the debtor's home, a letter sent by mail to the debtor's work, an email message sent to the debtor's email address, an SMS message sent to the debtors telephone, a phone call made by a collection specialist to the debtors home, a phone call made by a collection specialist to the debtors office, no action, restructuring the delinquent account, forgiving a portion of the delinquent account, utilizing an automatic/automated agent, resending the bill, debt counseling, forbearance program, payment matching program, settlement agreement, running a skip trace search, multiple smaller payments, legal action or combinations thereof.

14. The system of claim 13, wherein the treatments are defined by a time duration, numeric value, frequency or combinations thereof.

15. The system of claim 14, wherein the time duration is selected from a group comprising days, weeks, months, quarters, years or combinations thereof.

16. The system of claim 14, wherein the numeric value is a settlement percentage.

17. The system of claim 14, wherein the frequency is the number of times the treatment is repeated within a fixed time period.

18. The system of claim 1, wherein the fitness score comprises performance measures fed into a fitness function which summarizes the performance measures into a single score.

19. The system of claim 18, wherein the performance measures are selected from a group comprising the average cost incurred on the delinquent accounts through the time the delinquent account exited collections, the recovery amount of the delinquent account, time to recovery on the delinquent account, number of payments, the final outcome on an account, recovery success percentage for the delinquent account, partial payments, completion of payment programs or combinations thereof.

20. The system of claim 18, wherein the fitness function comprises the overall average for the entire historical group and the average for the neighborhood group, weighted by the number of historical accounts in the neighborhood group.

21. A computer-implemented method for recommending treatments for one or more delinquent accounts at a particular point in time the method comprising the computer-implemented steps of:
  accessing one or more servers, the one or more servers comprising a database with one or more sub-models, and a memory comprising reference data for one or more prototype accounts, the prototype accounts being a subset of historical accounts stored in the memory and including results from test accounts created to test the efficacy of new treatments or new sets of rules, thereby providing a mechanism for learning and adapting to new treatments and debtor behavior;
  expressing the reference data as historical vectors in an n-dimensional feature space;
  receiving at least one recommendation request data record for each of one or more delinquent accounts;
  converting the at least one recommendation request data record to request vectors using scores from the one or more sub-models;
  selecting one or more neighbor vectors from the historical vectors for each of the request vectors, based on an algorithm analysis of data in the n-dimensional feature space;
  determining neighbor fitness values for each of the selected one or more neighbor vectors by looking forward in historical time for each of the one or more prototype accounts in the one or more neighbor vectors;
  generating, for each of the request vectors, a subset list of allowed treatments by applying one or more sets of policy or regulation rules to a superset list of all treatments, the subset and superset lists being generated regardless of similarities between the one or more delinquent accounts and the one or more neighbor vectors;
  computing a treatment fitness score for each of the treatments in the subset list, using the neighbor fitness values from the neighbor vectors that experienced a particular treatment being analyzed and using events outside the one or more neighbor vectors;
  selecting at least one of the treatments in the subset list for each of the at least one recommendation request based on the treatment fitness score to recommend treatments for delinquent accounts based on the success of treatments in the subset list; and
  presenting the selected at least one treatment to a user,
  wherein the one or more prototype accounts in the memory increases speed of operations of the program when the program is executed by the processor.

22. The computer-implemented method of claim 21, wherein the delinquent accounts are selected from the group comprising delinquent accounts, accounts in collection, historical accounts, test accounts, new accounts or combinations thereof.

23. The computer-implemented method of claim 21, wherein overall categories of the allowed treatments may include specific treatment to use, variant of the treatment, sequence of treatments, phone number to use, time of day to call, prioritization of accounts to receive treatment, specific collector to work an account.

24. The computer-implemented method of claim 21, wherein the one or more rules are selected from a group comprising policy and regulation expert rules, policies of the user, any applicable governmental regulations, financial industry regulations or combinations thereof.

25. The computer-implemented method of claim 21, further comprising the step of providing a rationale for recommending the selected at least one treatment.

26. The computer-implemented method of claim 21, wherein the sub-models are built using one or more models selected from a group comprising neural networks, regression analysis, integrated rules systems, decision tree models, other statistical models or combinations thereof.

27. The computer-implemented method of claim 21, wherein the reference data comprises account demographics, treatments, model scores, account properties, account behaviors, days past due, the final collections result on the account or combinations thereof.

28. The computer-implemented method of claim 21, wherein the reference data comprises multiple entries for the historical account data at different points in time.

29. The computer-implemented method of claim 21, wherein receiving the one or more recommendation request data, further comprises receiving a request for recommendation or notification record from a client device in a predefined API or XML format.

30. The computer-implemented method of claim 21, wherein the algorithm includes a calculation of the similarity between two or more n-feature vectors in an n-dimensional feature space.

31. The computer-implemented method of claim 30, wherein the similarity is a calculation of the distance between two or more n-feature vectors in an n-dimensional feature space.

32. The computer-implemented method of claim 30, wherein the algorithm calculation is selected from a group comprises Mahalanobis distance calculation, Manhattan distance formulas, Euclidean distance formulas, Pearson correlation coefficient, Spearman rank correlation, Kendall's τ correlation, mean squared differences, entropy, adjusted cosine similarity or combinations thereof.

33. The computer-implemented method of claim 21, wherein the treatments are selected from a group which may include a letter sent by mail to the debtor's home, a letter sent by mail to the debtor's work, an email message sent to the debtor's email address, an SMS message sent to the debtors telephone, a phone call made by a collection specialist to the debtors home, a phone call made by a collection specialist to the debtors office, no action, restructuring the delinquent account, forgiving a portion of the delinquent account, utilizing an automatic/automated agent, resending the bill, debt counseling, forbearance program, payment matching program, settlement agreement, running a skip trace search, legal action, multiple smaller payments, or combinations thereof.

34. The computer-implemented method of claim 33, wherein the treatments are defined by a time duration, numeric value, frequency or combinations thereof.

35. The computer-implemented method of claim 34, wherein the time duration is selected from a group comprising days, weeks, months, quarters, years or combinations thereof.

36. The computer-implemented method of claim 34, wherein the numeric value is a settlement percentage.

37. The computer-implemented method of claim 34, wherein the frequency is the number of times the treatment is repeated within a fixed time period.

38. The computer-implemented method of claim 21, wherein the fitness score comprises performance measures fed into a fitness function which summarizes the performance measures into a single score.

39. The computer-implemented method of claim 38, wherein the performance measures are selected from a group comprising the average cost incurred on the delinquent accounts through the time the delinquent account exited collections, the recovery amount of the delinquent account, time to recovery on the delinquent account, number of payments, the final outcome on an account, recovery success percentage for the delinquent account, partial payments, completion of payment programs or combinations thereof.

40. The computer-implemented method of claim 38, wherein the fitness function comprises the overall average for the entire historical group and the average for the neighborhood group, weighted by the number of historical accounts in the neighborhood group.

* * * * *